United States Patent
Baker et al.

(10) Patent No.: US 10,519,006 B2
(45) Date of Patent: Dec. 31, 2019

(54) ELEVATOR GUIDE RAIL BRACKET AND METHOD FOR SECURING A GUIDE RAIL

(71) Applicants: Richard Baker, Bonnybridge (GB); Jari Hakkila, Kirkkonummi (FI)

(72) Inventors: Richard Baker, Bonnybridge (GB); Jari Hakkila, Kirkkonummi (FI)

(73) Assignee: Kone Corporation, Helsinki (FI)

( * ) Notice: Subject to any disclaimer, the term of this patent is extended or adjusted under 35 U.S.C. 154(b) by 266 days.

(21) Appl. No.: 15/168,422

(22) Filed: May 31, 2016

(65) Prior Publication Data
US 2017/0015523 A1    Jan. 19, 2017

(30) Foreign Application Priority Data
Jul. 17, 2015    (EP) ..................................... 15177201

(51) Int. Cl.
*B66B 7/02* (2006.01)
*B66B 19/00* (2006.01)
*F16M 13/02* (2006.01)

(52) U.S. Cl.
CPC .............. *B66B 7/023* (2013.01); *B66B 7/024* (2013.01); *B66B 19/002* (2013.01); *F16M 13/02* (2013.01)

(58) Field of Classification Search
CPC ......... B66B 7/023; B66B 7/024; B66B 7/026; B66B 19/002; E01B 23/04
See application file for complete search history.

(56) References Cited

U.S. PATENT DOCUMENTS

| | | | | |
|---|---|---|---|---|
| 411,958 | A * | 10/1889 | Forsyth | E01B 23/04 238/340 |
| 998,972 | A * | 7/1911 | Lukens | E01B 23/04 238/340 |
| 1,389,066 | A * | 8/1921 | Murphy | E01B 23/04 238/10 R |
| 1,425,915 | A * | 8/1922 | Taggart | E01B 23/04 238/305 |
| 1,505,345 | A * | 8/1924 | Heptner | E01B 23/04 238/340 |
| 1,631,034 | A * | 5/1927 | Holst | E01B 23/04 238/341 |
| 6,371,249 | B1 * | 4/2002 | Schops | B66B 7/024 187/408 |

(Continued)

FOREIGN PATENT DOCUMENTS

SU    965938 A1    10/1982

OTHER PUBLICATIONS

European Search Report for European Application No. 15177201.9 dated Nov. 20, 2015.

*Primary Examiner* — Minh Truong
(74) *Attorney, Agent, or Firm* — Harness, Dickey and Pierce, P.L.C.

(57) ABSTRACT

The invention concerns an elevator guide rail bracket for securing a guide rail section to a base via a counterpart, the guide rail bracket comprising a face, a pair of fixed claws arranged into the face, and a fastening part with fastening elements. The claws form a claw coupling with the guide rail section. The claw coupling has a fitting position and a retaining position. The guide rail bracket is attached to the guide rail section by fitting the guide rail section between the claws and turning the guide rail bracket from the fitting position to the retaining position.

16 Claims, 3 Drawing Sheets

(56) References Cited

U.S. PATENT DOCUMENTS

2012/0133164 A1* 5/2012 Sanz Gamboa ........ B66B 7/024
  294/119.1
2018/0370766 A1* 12/2018 Madureira De Almeida ..............
  B66B 7/024

* cited by examiner

ELEVATOR GUIDE RAIL BRACKET AND METHOD FOR SECURING A GUIDE RAIL

This application claims priority to European Patent Application No. EP15177201.9 filed on Jul. 17, 2015, the entire contents of which are incorporated herein by reference.

TECHNICAL FIELD

The present disclosure relates to an elevator guide rail bracket and a method for securing guide rails to a base. Particularly, the method relates to securing guide rails to elevator shaft walls or dividing beams.

BACKGROUND OF THE INVENTION

Guide rails are used to guide the vertical movement of an elevator car or an elevator counterweight in an elevator shaft within a building or other such structure. In an elevator shaft for a single elevator car, there are typically two guide rails on opposite walls of the elevator shaft. In the case of multiple elevator cars arranged to run in a single shaft, one guide rail may be on the wall of the shaft, the other on the dividing beam between two elevator cars, or both guide rails may be arranged onto the dividing beams, depending on the configuration of the elevator shaft and the number of elevator cars and counterweight arranged to run in the shaft.

The elevator car or counterweight is linked to the guide rails through guide shoes, guide rollers or other guide elements facing the guide rails. Guide rails are constructed from multiple guide rail sections, connected to each other from their vertical ends to form a continuous guiding structure for the elevator car. The guide rail sections are secured to a base arranged into the walls of the elevator shaft, or to the dividing beams of the elevator shaft, though guide rail brackets.

The guide rail brackets are fixed to the base in the elevator shaft walls or dividing beams via different counterparts or directly via fastening parts arranged fixedly into the guide rail brackets. The fixing of the guide rail bracket to its counterpart can be done for example with bolts or screws, and the counterpart in turn is fastened or fixed to the base with different attaching elements.

Typically, the guide rail brackets are attached to guide rails sections by separate connecting elements or rail clips that are connected to the body of the guide rail bracket by a nut-and-bolt type fixing elements, pins, screws, clamps or other tighteners which are tightened to hold the guide rail section in place within the guide rail bracket. The connecting elements may include intermediate elements such as washers, seals or packings, as well.

In the installation process of securing guide rail sections to the elevator shaft wall or dividing beam to form the continuous guide rail, this kind of step for fitting a guide rail section into the guide rail bracket with separate or detachable clips is time-consuming and labor-intensive. The requirement for manual installation makes the process expensive. The manufacture of such complicatedly structured guide rail brackets can be costly.

In addition, with conventional guide rail brackets, controlling or counteracting the longitudinal movement of the guide rails in relation to the elevator shaft wall structures, caused by for example settling of buildings during the first months after the construction phase, may be complicated or require additional structures in the guide rail brackets. This may further compound to the manufacturing and installation drawbacks mentioned above.

SUMMARY OF THE INVENTION

An object of the present invention is to provide an improved elevator guide rail bracket and a method for securing guide rails to a base. The method for securing guide rails is in particular, but not only, intended for elevator systems, especially for passenger or freight elevators of buildings. However, the method for securing guide rails may be used in connection with other guide rails as well.

By a guide rail herein is meant a continuous rail that guides the substantially vertical movement of an elevator car, or an elevator counterweight in an elevator shaft. By guide rail section is meant a section of a guide rail that is attached from its one end to an adjacent guide rail section or from its both ends to two adjacent guide rail sections, respectively.

By a guide rail bracket is meant a bracket structure, attachable to the guide rail or guide rail section, which is used for securing a guide rail or a guide rail section to a base via a counterpart. By a base is meant an attachment structure arranged into the elevator shaft wall or the dividing beam, to which the guide line bracket can be fixed via the counterpart. The fixing of the counterpart to the base is achieved with conventional fixing means, for example bolts or screws, and also the fixing of the guide rail bracket to the counterpart is achieved with conventional means.

By securing guide rails herein is meant a procedure of fixing, fastening or otherwise attaching guide rails or guide rail sections to a base arranged into the elevator shaft walls or dividing beams in order to form a continuous guide rail system as explained above.

The elevator guide rail bracket for securing a guide rail section to a base via a counterpart presented here is characterized by comprising a face, a pair of fixed claws arranged into the face, and a fastening part with fastening elements for fastening the guide rail bracket to the counterpart; and further characterized in that the claws form a claw coupling with the guide rail section, which claw coupling has a fitting position and a retaining position, and that the guide rail bracket is attached to the guide rail section by fitting the guide rail section between the claws and turning in plane the guide rail bracket in relation to the longitudinal direction of the guide rail section from the fitting position to the retaining position.

In one embodiment of the invention, the claws are arranged so that the guide rail bracket is attached to the guide rail section by turning the guide rail bracket 45° in plane in relation to the longitudinal direction of the guide rail section.

In one embodiment of the invention, each claw comprises a planar part arranged parallel to the face, and a slanted edge for holding the guide rail section in place.

In another embodiment the claws are arranged so that a first distance between the slanted edges of the claws is equal or larger than the width of the guide rail section.

In one embodiment, an intermediate part is arranged between each claw and the face of the guide line bracket.

In another embodiment, the intermediate parts are arranged at a second distance from each other, which second distance is equal or larger than the width of the guide rail section.

In yet another embodiment, the second distance is the distance between inner sides of the intermediate parts.

In one embodiment, in a sectional view of the claws, each claw is an L-shaped projection extending from the face, in which projection an intermediate part of the claw forms a first portion of the claw, extending a third distance in a transverse direction in relation to the face, and a planar part forms a second portion of the claw, extending parallel to the face.

In another embodiment, the third distance is equal or larger than the thickness of the guide rail section.

In another aspect there is disclosed a method for securing a guide rail section to a base by at least one guide rail bracket via a counterpart, characterized by the at least one guide rail bracket comprising a face, a pair of fixed claws arranged into the face, and a fastening part with fastening elements for fastening the guide rail bracket to the counterpart; further characterized in that the guide rail bracket is attached to the guide rail section by turning in plane the guide rail bracket in relation to the longitudinal direction of the guide rail section from a fitting position to a retaining position so that a claw coupling is formed between the claws and the guide rail section.

In one embodiment of the method for securing a guide rail section to a base, the guide rail bracket is attached to the guide rail section by turning the guide rail bracket 45° in plane in relation to the longitudinal direction of the guide rail section.

In another embodiment, in the locking position, the guide rail section is held in place by inner sides of intermediate parts and planar parts arranged to the claws.

In another embodiment, the guide rail section is secured onto a base in an elevator shaft wall and/or in an elevator shaft dividing beam.

In another embodiment, the guide rail section is a part of a guide rail of an elevator car and/or a guide rail of an elevator counter weight.

In yet another aspect there is disclosed an arrangement for securing guide rails, characterized by comprising at least one guide rail for guiding a movable elevator unit via guiding elements in an elevator shaft, the guide rail being constructed from at least one guide rail section secured to a base via a counterpart by at least one guide rail bracket, the guide rail bracket comprising a face, a pair of fixed claws arranged into the face, and a fastening part with fastening elements for fastening the guide rail bracket to the counterpart; further characterized in that in at least some of the guide rail brackets, the claws form a claw coupling with the guide rail section, which claw coupling has a fitting position and a retaining position, and the guide rail bracket is attached to the guide rail section by fitting the guide rail section between the claws and turning in plane the guide rail bracket in relation to the longitudinal direction of the guide rail section from the fitting position to the retaining position.

The invention according to the present disclosure offers specific advantages over prior art.

The disclosed guide rail bracket has a simple structure which makes it straightforward and easy to install and manufacture. Therefore savings in installation time and cost, as well as in manufacture costs, may be attained.

The simplified structure of the guide rail bracket eliminates the installation step of securing the guide rail section to the guide rail bracket by separate rail clips that need to be tightened in place via fixing elements such as bolts or screws. This makes fully or partially automated installation, for example the use of installation platforms with robotic arms or other automated installation tools more feasible, therefore eliminating the need for costly manual installation.

Furthermore, the structure of the guide rail bracket and the method for securing a guide rail bracket enables the longitudinal movement of the guide rails in relation to the elevator shaft walls and/or dividing beams. The dimensional changes of the guide rail and the elevator shaft structures are different during the settling period of a building or other structure within which the elevator shaft is arranged. For example, drying of concrete after the construction phase of a building causes shrinking and/or settling of the building, which may result to curving of the guide rails if the guide rail sections cannot move in relation to the building or more specifically, in relation to the elevator shaft wall or dividing beam.

The dimensions of the guide rail bracket as disclosed here allow longitudinal movement of the guide rails and guide rail sections in a simple manner without any separate correcting or aligning structures. The movement is enabled without any additional correcting or reinstallation procedures. This will further alleviate the above-mentioned drawbacks concerning manufacturing costs and/or installation time and costs.

BRIEF DESCRIPTION OF DRAWINGS

The accompanying drawings, which are included to provide a further understanding of the invention, and which constitute a part of this specification, illustrate embodiments of the invention. Together with the description the drawings are meant to help to explain the principles of the invention. The invention is not limited to the specific embodiments illustrated in the drawings.

In the drawings.

The following reference symbols have been used to annotate different parts and relative dimensions of the invention throughout the figures:

1 arrangement for securing guide rails
10 guide rail bracket
11 face
12 fastening part
120, 121 fastening elements
13, 14 claw
130, 140 planar part
131, 141 slanted edge
15 counterpart
16, 17 intermediate part
160, 170 inner side of the intermediate part
2 guide rail
21 guide rail section
22 flange
220 planar section of the flange
3 elevator shaft
31 elevator shaft wall or dividing beam 4 elevator unit (car/counterweight)
41 guide rollers/guide elements
$d_1$ distance between the angled edges
$d_2$ distance between the inner sides of the intermediate parts
$d_3$ extension or height of the intermediate part from the face
W width of the guide rail section/flange
t thickness of the guide rail section/flange
D longitudinal direction of the guide rail section

DETAILED DESCRIPTION OF THE EMBODIMENTS

FIG. 1, FIG. 2, FIG. 3a and FIG. 3b present an elevator guide rail bracket 10. The guide rail bracket 10 comprises a face 11 and a fastening part 12 extending substantially perpendicularly from an edge of the face 11. The fastening part comprises fastening elements 120, 121 for fixing the guide rail bracket 10 to a counterpart 15.

The fastening elements 120, 121 may include fixing elements 120 such bolts, screws, pins or similar; washers, seals, packings or similar; and openings 121 arranged into the fastening part 12 to allow fixing into the counterpart 15 which is in turn secured to a base (not shown in the figures) arranged into the elevator shaft wall or dividing beam 31. The base may be any suitable base or other affixing element known form the art.

Figure 1:
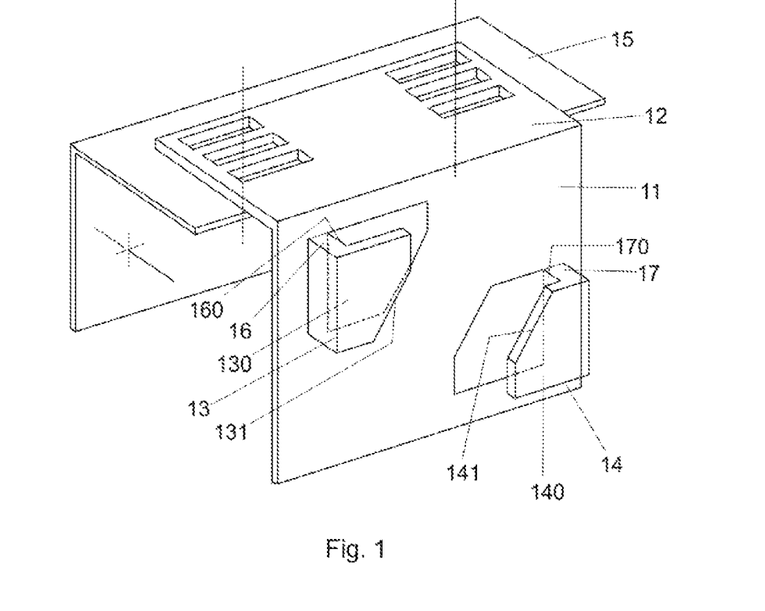
FIG. 1 presents a simplified schematic overview of a guide rail bracket according to the present disclosure in an axonometric projection.
Figure 2:
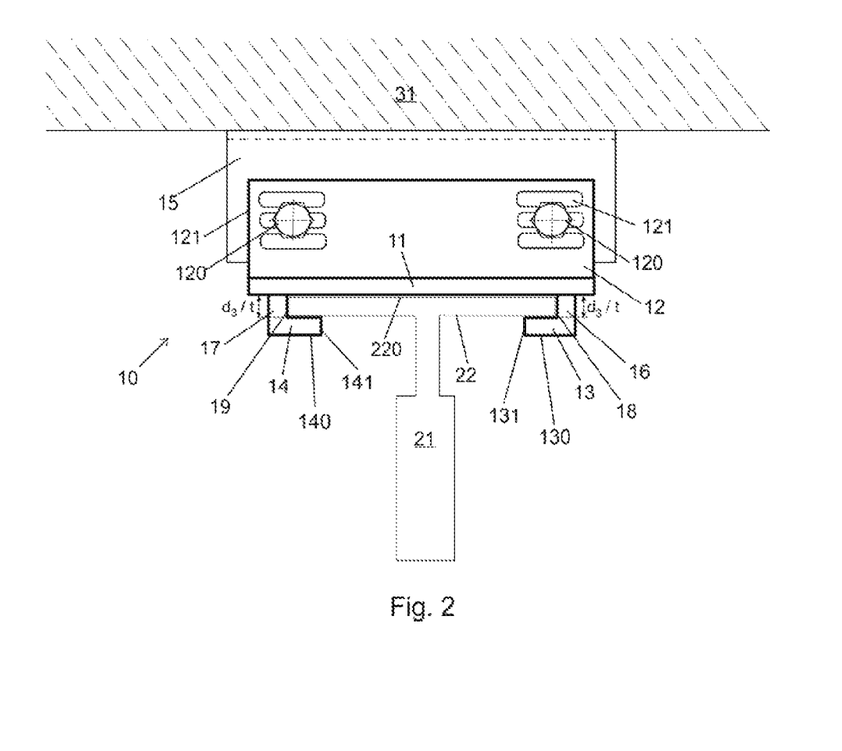
FIG. 2 presents a simplified schematic overview of an embodiment of the guide rail bracket according to the present disclosure, where the guide rail bracket is attached to a guide rail section, viewed from above.

In FIGS. 1 and 2, the fastening elements 120, 121 are shown only in a simplified manner from which it is to be understood that the actual fastening parts may be a combination of any element known in the art suitable for fixing a guide rail bracket to the counterpart 15. The counterpart 15 may be secured to the base in any suitable manner known in the art, such as bolts, screws, pins or similar, including different elements for attenuating vibrations or suppressing noise etc.

The face 11 comprises a pair of claws 13, 14 for attaching the guide rail bracket 10 to a guide rail section 21. More precisely, the guide rail bracket can be attached to a flange 22 of the guide rail section 21, which can be for example T-shaped in cross-section. In one embodiment, the flange 22 has a planar section 220, which is a part facing the elevator shaft wall or dividing beam 31, and the face 11 of the guide rail bracket 10, when the guide rail section 21 is secured to a base. The cross-section of the guide rail section 21 may also be of any other suitable form, and the guide rail bracket 10, the face 11 and the claws 13, 14 may be formed to emulate or match the dimensions of the guide rail bracket 21.

Figure 4:
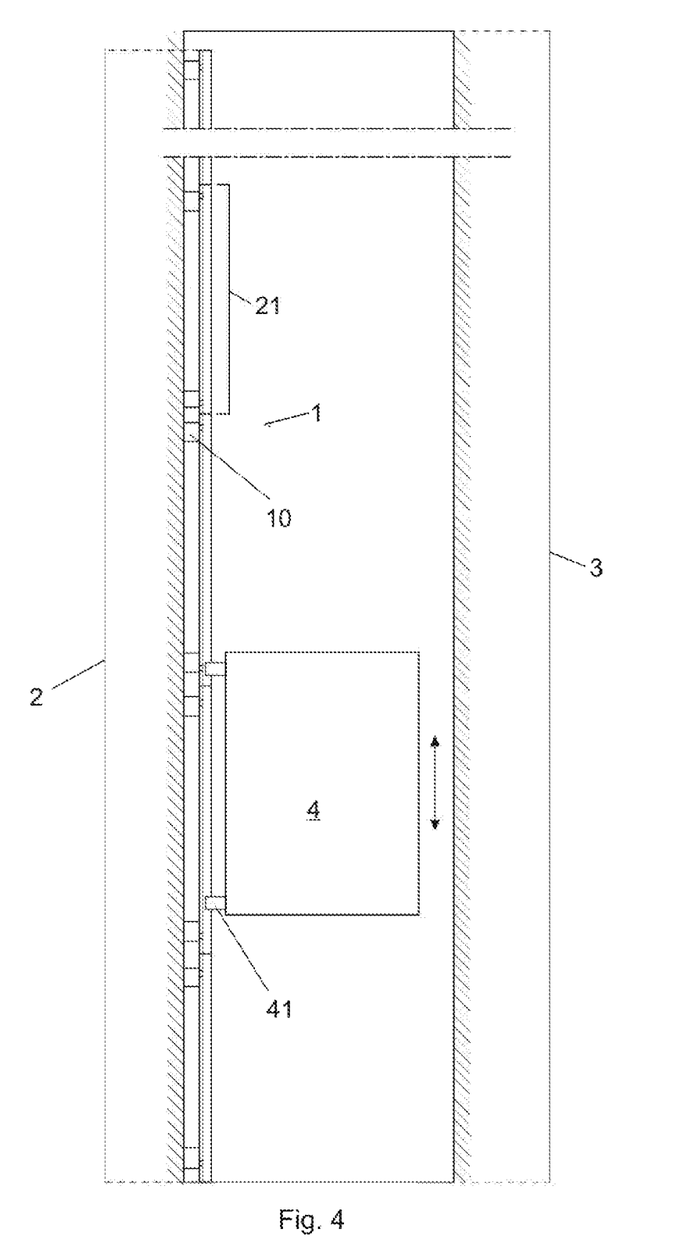
FIG. 4 presents a simplified schematic overview of an elevator in which a guide rail securing arrangement according to the present disclosure is used.

The guide rail section 21 of a guide rail 2 also comprises a guide bar with a guiding track in which the guide elements 41 of an elevator unit 4 are arranged to move vertically. The elevator unit 4 may be an elevator car or an elevator counterweight.

Each claw 13, 14 is arranged to extend, protrude or rise up from the face 11 of the guide rail bracket 10. The claw 13, 14 is formed from the face 11 by punching, piercing, perforating or pressing through the face 15 in such a way that a part of the so formed claw formation remains attached to the face 11 via an intermediate part 16, 17. The intermediate part 16, 17 is arranged to extend from the face 11 at a 90° angle or substantially at 90° angle in relation to the plane of the face 11.

Each claw 13, 14 comprise a planar part 130, 140 arranged to extend substantially parallel with the face 11 and at a 90° angle in relation to the intermediate part 16, 17. The planar part 130, 140 is arranged to be oriented towards the middle part of the face 11, i.e. away from the edges of the face 11.

During the formation of the claw 13, 14, the punched, pierced, perforated or otherwise pressed-through part of the face 11 is first turned upwards at a 90° angle from the face 11, and then turned again at a 90° angle away from the outer edges of the face 11 to form both the intermediate part 16, 17 and the planar part 130, 140. The claw is therefore a fixed or integral extension or projection of the face 11. The claw is essentially L-shaped when viewed directly from above or below in the longitudinal direction of the guide rail section 21, as can be seen in FIG. 2.

The planar part 130, 140 comprises a slanted edge 131, 141, arranged substantially at an angle in relation to the upper and lower edges of the face 11 of the guide rail bracket 10 when the guide rail bracket 10 is positioned transversely in relation to the longitudinal direction D of the guide rail section 21. Preferably, the angle of the slanted edge 131, 141 is 45° in relation to the aforementioned edges, but depending on the shaping and dimensions of the guide rail bracket 10 and the claws 13, 14, the angle may vary between 20-70°.

The first distance $d_1$ (i.e. the diagonal distance) between the slanted edges 131, 141 of the two opposing claws 13, 14 is chosen to allow the insertion or fitting of the guide rail section 21 between the claws 13, 14. The first distance $d_1$ is therefore at least equal or larger by a suitable clearance than the width W of the guide rail section 21.

In one embodiment, the first distance $d_1$ is chosen to allow the fitting of the flange 22 between the claws 13, 14. In this case, the first distance $d_1$ is at least equal or larger by a suitable clearance than the width W of the flange 22.

Figure 3A:
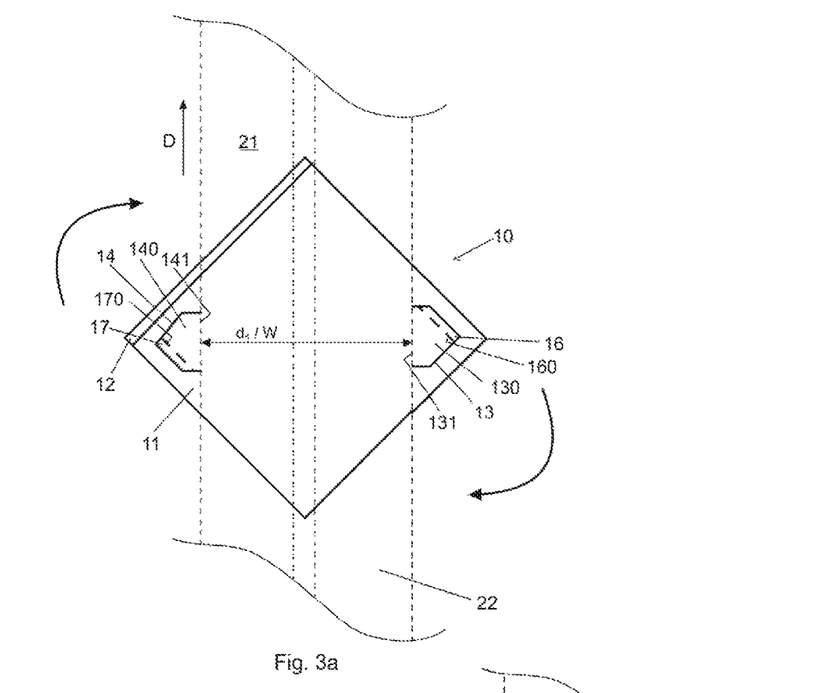
FIG. 3a presents a simplified schematic overview of an embodiment of the guide rail bracket according to the present disclosure, where a claw coupling has been formed between the guide rail bracket and a guide rail section, and the claw coupling is in a fitting position.

For example, when the width W of the guide rail 21 or the flange 22 is 82 mm, the first distance $d_1$ is at least 82 mm with an addition of a suitable clearance to allow the guide rail section 21 or the flange 22 to be fitted between the angled edges 131, 141 when the claw coupling arranged between the guide rail bracket 10 and the guide rail section 21 or the flange 22 is in a fitting position (FIG. 3a). A suitable clearance may be, for example, 0.1-2 mm, preferably 0.1-0.5 mm.

The insertion or fitting is achieved by bringing the guide rail section 21 flush or engagedly in contact with the face 11 of the guide rail bracket 10 when the guide rail bracket 10 is positioned at an angle in relation to the longitudinal direction D of the guide rail section 21. Preferably, the guide rail bracket 10 is so formed that the angle of insertion or fitting is 45°. Depending on the shaping and dimensions of the guide rail bracket 10 and the claws 13, 14, the angle may vary between 20-70°.

In one embodiment, the insertion or fitting is achieved by bringing the flange 22, more precisely the planar section 220, flush or engagedly in contact with the face 11 of the guide rail bracket 10 when the guide rail bracket 10 is positioned at an angle in relation to the longitudinal direction D of the guide rail section 21. Preferably also in this case, the guide rail bracket 10 is so formed that the angle of insertion or fitting is 45°, but depending on the shaping and dimensions of the guide rail bracket 10 and the claws 13, 14, the angle may vary between for example 20-70°.

The second distance $d_2$ between the intermediate parts 16, 17 is chosen to allow the attachment of the guide rail bracket 10 to a guide rail section 21. The second distance $d_2$ is therefore at least equal or larger by a suitable clearance than the width W of the guide rail section 21 or the width W of the flange 22. The clearance is so chosen that the longitudinal movement of the guide rail or guide rail section, secured into its base by the guide rail bracket, is enabled, i.e. the guide rail or guide rail section can move or slide lengthwise in relation to the elevator shaft wall and/or dividing beam, while still being fixedly attached to the base. This is especially advantageous when the elevator shaft wall structure settles during the first months after the construction phase due to drying of concrete and subsequent shrinking of the building or other construction into which the elevator shaft is arranged.

For example, if the width W of the guide rail section 21 or the flange 22 is 82 mm, the second distance $d_2$ is 82 mm with a suitable clearance to allow the guide rail section to be settled between the inner edges 160, 170 of the intermediate parts 16, 17. The clearance may be, for example, 0.1-2 mm, preferably 0.1-0.5 mm.

Figure 3B:
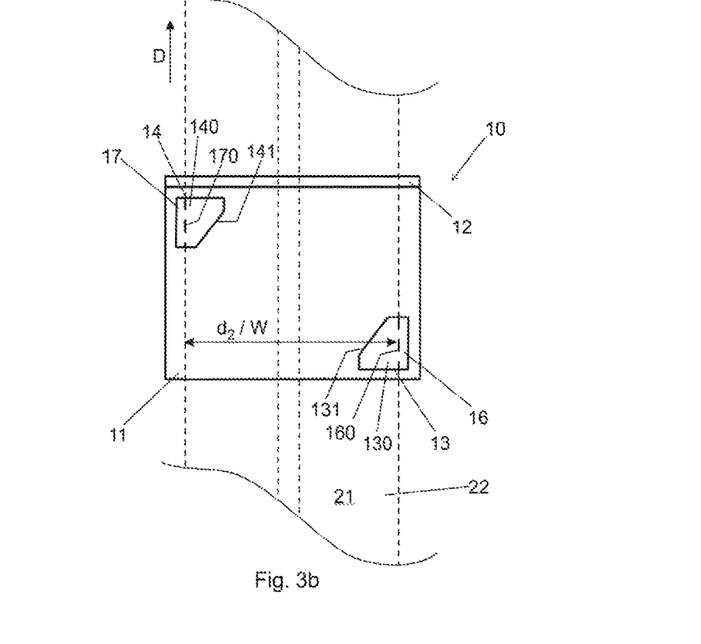
FIG. 3b presents a simplified schematic overview of an embodiment of the guide rail bracket according to the present disclosure, where a claw coupling has been formed between the guide rail bracket and a guide rail section, and the claw coupling is in a retaining position.

The attachment of the guide rail bracket 10 to the guide rail section 21 is achieved when the guide rail bracket 10, with its claws 13, 14 positioned around the guide rail section 21, or in another embodiment, around the flange 22, as described above, is turned in plane in relation to the guide rail section 21 for an angle, so that the claw coupling, formed between the guide rail bracket 10 and the guide rail bracket 21 or between the guide rail bracket 10 and the flange 22, is settled in a retaining position (FIG. 3b). Preferably, the guide rail bracket 10 is turned for an angle of 45°. Depending on the shaping and dimensions of the guide rail bracket 10 and the claws 13, 14, the angle may vary between for example 20-70°.

After the turning, the guide rail section 21 ends up between the inner edges 160, 170 of the opposing intermediate parts 16, 17 and is held in place by the planar parts 130, 140 of the claws 13, 14 and the inner edges 160, 170 of the intermediate parts 16, 17.

In one embodiment, the flange 22 ends up between the inner edges 160, 170 of the opposing intermediate parts 16, 17 and is held in place by the planar parts 130, 140 of the claws 13, 14 and the inner edges 160, 170 of the intermediate parts 16, 17.

The intermediate part 16, 17 is arranged to extend a third distance $d_3$ in a transverse direction in relation to the face 11, i.e. the third distance $d_3$ is the height of the intermediate part 16, 17 projecting upwards from the face 11. The third distance $d_3$ is chosen to allow the insertion of the guide rail section 21, or the insertion of the flange 22, within the guide rail bracket 10. The third distance $d_3$ is at least equal or larger by a suitable clearance than the thickness t of the guide rail section 21 or the flange 22. Again, the clearance is chosen to allow the longitudinal movement of the guide rail or guide rail section, secured into its base by the guide rail bracket. The clearance may be, for example, 0.1-2 mm, preferably 0.1-0.5 mm.

The dimensions of the claws 13, 14 are chosen to accommodate the dimensions and weight of the guide rail section 21. For example, the weight of a guide rail section 21 can vary between 100-260 kg.

The guide rail bracket 10 can be made of a material selected from the following group: steel, aluminum, a metal alloy or an engineered composite material such as a plastic composite. The material is selected according to the specifications of the guide rail section 21, guide rails 2, elevator shaft wall and/or dividing beam material etc. with which the guide rail bracket 10 is to be used, for example depending on the weight and dimensions of the guide rail section 21.

In the following, a method for securing an elevator guide rail section 21 to a base is explained in detail. FIG. 3a and FIG. 3b present the steps of attaching the guide rail bracket 10 to the guide rail section 21, and the two positions, a first, fitting position (FIG. 3a) and a second, retaining position (FIG. 3b), of the claw coupling formed between the guide rail bracket 10 and the guide rail section 21. The guide rails 2 may be the guide rail of an elevator car 4 or the guide rail of an elevator counterweight. The guide rail bracket may also be attached to the flange 22 of the guide rail section 21.

First, the above-described guide rail bracket 10 is attached to the guide rail section 21 or to the flange 22 by inserting or fitting the guide rail section 21 or the flange 22 between the claws 13, 14 of the guide rail bracket 10. This is done by 1) bringing the guide rail bracket 10 in contact with the guide rail section 21. More specifically, the guide rail bracket 10 is placed behind the planar section 220 of the flange 22, which is the part or the guide rail section 21 facing the elevator shaft wall or dividing beam 31 when secured to the base; and 2) fitting the guide rail section 21 or the flange 22 between the slanted edges 131, 141 of the planar parts 130, 140 of the claws 13, 14 so that the guide rail section 21 is flush or engagedly in contact with the face 11 of the guide rail bracket 10. More specifically, the planar section 222 is to be in contact with the face 11.

In order to achieve this above-described claw coupling in the fitting position, the guide rail bracket 10 is placed in contact with the guide rail section 21 in an angled position in relation to the longitudinal direction D of the guide rail section 21. Preferably, the angle is 45°, but depending on the shaping and dimensions of the guide rail bracket 10 and the claws 13, 14, the angle may vary between 20-70°.

Next, guide rail bracket 10 is turned in plane in relation to the longitudinal direction D of the guide rail section 21 for an angle. In one embodiment, the guide rail bracket 10 is turned clockwise. Preferably, the guide rail 10 is turned for 45° in relation to the longitudinal direction D of the guide rail section 21. Depending on the shaping and dimensions of the guide rail bracket 10 and the claws 13, 14, the angle may vary between 20-70°.

When the guide rail bracket 10 is turned to a position where the upper and lower edges of the face 11 are positioned perpendicular in relation to the longitudinal direction D of the guide rail section 21, the guide rail section 21 is settled between the inner edges 160, 170 of the intermediate parts 16, 17 of the claws 13, 14, and the guide rail section 21 is held in place by the claws 13, 14. More specifically, the guide rail section 21 is held in place by the inner edges 160, 170 of the intermediate parts 16, 17, and the planar parts 130, 140 of the claws 13, 14. In this position, the claw coupling between the guide rail bracket 10 and the guide rail section 21 is in the retaining position.

In one embodiment, when the guide rail bracket 10 is turned to a position where the upper and lower edges of the face 11 end up perpendicular in relation to the longitudinal direction D of the guide rail section 21, the flange 22 is settled between the inner edges 160, 170 of the intermediate parts 16, 17 of the claws 13, 14, and the flange 22 is held in place by the claws 13, 14. More specifically, the flange 22 is held in place by the inner edges 160, 170 of the intermediate parts 16, 17, and the planar parts 130, 140 of the claws 13, 14.

When the guide rail bracket 10 is attached to the guide rail section 21, or to the flange 22, the guide rail bracket 10 is fixed to the counterpart 15 via the fastening part 12 and its fastening elements 120, 121 in any suitable manner known from the art. The guide rail bracket 10 may also be fastened to the counterpart 15 prior to its attachment to the guide rail section 21, or the flange 22.

Finally, in order to form a guide rail 2, at least one guide rail section 21 is secured to a base arranged into an elevator shaft wall or dividing beam 31 by fixing the counterpart into the base by any suitable means known from the art. The counterpart 15 may also be secured to the base prior to fixing it to the guide rail bracket 10.

The sequence of the steps of securing, fixing and attaching the different parts—the counterpart 15 to the base; the guide rail bracket 10 to the counterpart 15; and the guide rail section 21 or the flange to the guide rail bracket 10—depends on the manner of installation chosen to execute the method for securing of guide rails 2 to the elevator shaft wall or dividing beam 31. The sequence can be any suitable combination of any of the aforementioned steps.

The above-described method is to be understood as one possible embodiment of the method for securing a guide rail to a base. It is to be understood that the method may comprise other steps or alternative ways of carrying out the method. For example, the guide rail bracket 10 and its claws 13, 14 can be formed so that it can be turned counter-clockwise instead of clockwise in order to achieve the attachment to a guide rail section 21 or the flange 22. For example, the fastening part 12 and its shape and dimensions can be arranged to accommodate the shape and dimensions of the counterpart 15. Depending on the shape and dimensions of the guide rail bracket 10 and the claws 13, 14, the guide rail bracket may be turned for any suitable angle, for example an angle between 20-70° in plane in relation to the longitudinal direction of the guide rail 2 or guide rail section 21.

The method for securing guide rails 2 described above can be executed manually, i.e. by a person or persons securing each guide rail section 21 with at least one guide rail bracket 10 with suitable tools. Further, the use of guide rail brackets 10 as disclosed by the invention enables and/or facilitates fully or partially automated installation, for example by an installation platform with a robotic installation arm.

An arrangement 1 for securing guide rails 2 is presented in FIG. 4. To form a continuous vertical guide rail 2 for guiding the vertical movements of an elevator unit, which can be an elevator car 4 or an elevator counterweight (not shown in the figure) via guide rollers or other guide elements 41 in an elevator shaft 3, two guide rail sections 21 are joined together at their ends by fishplates or other joining elements. The guide rail sections 21 are secured to a base arranged into the elevator shaft wall or into a dividing beam 31 by guide rail brackets 10.

In FIG. 4, for the sake of clarity only one, a first, guide rail 2 is shown. Typically, however, there is also a second guide rail arranged on the elevator shaft wall or dividing beam 31 substantially directly opposite the first guide rail 2. On this second guide rail, second guide rollers or other guide elements guide the vertical movement of the elevator car 4. There may be also one or more guide rails 2 for the counterweight arranged into the elevator shaft wall and/or dividing beam 31.

Depending on the configuration of the elevator shaft 3, and the number of elevator cars in the elevator shaft 3, the first guide rail 2 may be arranged on an elevator shaft wall 31 and the second on a dividing beam 31; both of the guide rails 2 may be arranged on elevator shaft walls 31; or both guide rails 2 may be arranged on dividing beams 31.

Within an arrangement for securing guide rails 1, at least one but preferably two guide rail brackets 10 are used per guide rail section 21 in the above described manner. Some of the guide rail brackets used can be of an accustomed or conventional type known from prior art, and some of the guide rail brackets 10 can be of the type according to the disclosed invention. All of the guide rail brackets can be guide rail brackets 10 according to the disclosed invention.

The above embodiments are to be understood as illustrative examples of the invention. Further embodiments of the inventions can be conceived. It is to be understood that any feature described herein in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An elevator guide rail bracket for securing a guide rail section to a base via a counterpart, the elevator guide rail bracket comprising:
   a face configured to connect to the counterpart secured to an elevator shaft such that the face is attached to a top surface of the counterpart and extends downwards from the top surface of the counterpart;
   a pair of fixed claws arranged into the face, the pair of fixed claws including planar parts parallel to the face and slanted edges, the slanted edges being separated from each other by a first distance corresponding to a width of a flange of the guide rail section,
   the pair of fixing claws configured to secure the elevator guide rail bracket to the guide rail section by (i) fitting onto the width of the flange of the guide rail section when the elevator guide rail bracket is in a fitting position where the slanted edges are parallel to each other with respect to a longitudinal direction of the guide rail section such that the elevator guide rail bracket is held between the slanted edges, and (ii) subsequently securing to the guide rail section when the elevator guide rail bracket is turned in a plane along the longitudinal direction of the guide rail section and parallel to the width of the flange of the guide rail section to a retaining position where the pair of fixing claws of the elevator guide rail bracket are offset from each other with respect to the longitudinal direction of the guide rail section such that a first one of the pair of fixed claws is relatively higher in the elevator shaft than a second one of the pair of fixed claws and the first distance between the slanted edges remains same in the fitting position and the retaining position; and
   a fastener configured to fasten the elevator guide rail bracket to the counterpart.

2. The elevator guide rail bracket according to claim 1, wherein the pair of fixed claws are arranged so that the elevator guide rail bracket is attached to the guide rail section by turning the elevator guide rail bracket 45° in plane in relation to the longitudinal direction of the guide rail section.

3. The elevator guide rail bracket according to claim 1, wherein the pair of fixed claws are arranged so that the first distance between the slanted edges is equal or larger than the width of the flange of the guide rail section.

4. The elevator guide rail bracket according to claim 1, wherein an intermediate part is arranged between each claw and the face of the elevator guide rail bracket.

5. The elevator guide rail bracket according to claim 4, wherein the intermediate part of respective ones of the pair of fixing claws are arranged at a second distance from each other, the second distance being equal or larger than the width of the flange of the guide rail section.

6. The elevator guide rail bracket according to claim 5, wherein the second distance is a distance between inner sides of the intermediate part of respective ones of the pair of fixing claws.

7. The elevator guide rail bracket according to claim 1, wherein in a sectional view of the pair of fixed claws, each claw is an L-shaped projection extending from the face, in which projection an intermediate part of the claw forms a first portion of the claw, extending a third distance in a transverse direction in relation to the face, and a planar part forms a second portion of the claw, extending parallel to the face.

8. The elevator guide rail bracket according to claim 7, wherein the third distance is equal or larger than a thickness of the guide rail section.

9. A method for securing a guide rail section to a base by at least one guide rail bracket via a counterpart secured to an elevator shaft, the at least one guide rail bracket including a face, a pair of fixed claws, and a fastener, the face configured to connect to the counterpart such that the face is attached to a top surface of the counterpart and extends downwards from the top surface of the counterpart, the pair of fixed claws including planar parts parallel to the face and slanted edges, the slanted edges being separated from each other by a first distance corresponding to a width of a flange of the guide rail section, the method comprising:
fitting the pair of fixed claws onto the width of the flange of the guide rail section when the guide rail bracket is in a fitting position where the slanted edges are parallel to each other with respect to a longitudinal direction of the guide rail section such that the at least one guide rail bracket is held between the slanted edges; and
securing the pair of fixed claws to the guide rail section by turning the guide rail bracket in plane along the longitudinal direction of the guide rail section and parallel to the width of the flange of the guide rail section to a retaining position where the pair of fixing claws of the at least one guide rail bracket are offset from each other with respect to the longitudinal direction of the guide rail section such that a first one of the pair of fixed claws is relatively higher in the elevator shaft than a second one of the pair of fixed claws and a claw coupling is formed between the pair of fixed claws and the guide rail section while the first distance between the slanted edges remains same in the fitting position and the retaining position.

10. The method for securing a guide rail section according to claim 9, wherein the guide rail bracket is attached to the guide rail section by turning the guide rail bracket 45° in plane in relation to the longitudinal direction of the guide rail section.

11. The method for securing a guide rail section according to claim 9, wherein the securing includes securing the guide rail section in place by inner sides of intermediate parts and the planar parts.

12. The method for securing a guide rail section according to claim 9, further comprising:
securing the guide rail section onto the base in an elevator shaft wall and/or in an elevator shaft dividing beam.

13. The method for securing a guide rail section according to claim 9, wherein the guide rail section is a part of a guide rail of an elevator car and/or a guide rail of an elevator counter weight.

14. An arrangement for securing guide rails to a base, the arrangement comprising
at least one guide rail configured to guide a movable elevator via guiding elements in an elevator shaft, the at least one guide rail being constructed from at least one guide rail section; and
at least one guide rail bracket including,
a face configured to connect to the counterpart secured to an elevator shaft such that the face is attached to a top surface of the counterpart and extends downwards from the top surface of the counterpart,
a pair of fixed claws arranged into the face, the pair of fixed claws including planar parts parallel to the face and slanted edges, the slanted edges being separated from each other by a first distance corresponding to a width of a flange of the guide rail section, the pair of fixing claws configured to secure the at least one guide rail bracket to the guide rail section by (i) fitting onto the width of the flange of the guide rail section when the guide rail bracket is in a fitting position where the slanted edges are parallel to each other with respect to a longitudinal direction of the guide rail section such that the guide rail bracket is held between the slanted edges, and (ii) subsequently securing to the guide rail section when the guide rail bracket is turned in a plane along the longitudinal direction of the guide rail section and parallel to the width of the flange of the guide rail section to a retaining position where the pair of fixing claws of the at least one guide rail bracket are offset from each other with respect to the longitudinal direction of the guide rail section such that a first one of the pair of fixed claws is relatively higher in the elevator shaft than a second one of the pair of fixed claws and the first distance between the slanted edges remains same in the fitting position and the retaining position, and
a fastener configured to fasten the guide rail bracket to a counterpart.

15. The arrangement according to claim 14, wherein the pair of fixed claws are arranged so that the at least one guide rail bracket is attached to the guide rail section by turning the at least one guide rail bracket 45° in plane in relation to the longitudinal direction of the guide rail section and parallel to the width of the flange of the guide rail section.

16. The arrangement according to claim 14, wherein the pair of fixed claws are arranged so that the first distance between the slanted edges is equal or larger than the width of the flange of the guide rail section.

* * * * *